United States Patent [19]

Burby et al.

[11] Patent Number: 4,742,606
[45] Date of Patent: May 10, 1988

[54] UNIVERSAL CARTRIDGE TRIMMING DEVICE

[76] Inventors: Owen Burby, 109 Hollyberry La., Plainville, Conn. 06062; Richard Clark, 39 Strong Rd., South Windsor, Conn. 06074

[21] Appl. No.: 899,436

[22] Filed: Aug. 22, 1986

[51] Int. Cl.⁴ .............................................. B23P 15/22
[52] U.S. Cl. .................................... 29/1.32; 408/127; 409/226
[58] Field of Search ...................... 29/1.32; 409/81, 82, 409/226; 408/127

[56] References Cited

U.S. PATENT DOCUMENTS

| 3,274,661 | 9/1966 | Westbrook | 29/1.32 |
| 3,388,619 | 6/1968 | Schreiber et al. | 409/81 |
| 3,785,742 | 1/1974 | Haase et al. | 408/3 |

Primary Examiner—P. W. Echols
Attorney, Agent, or Firm—CTC & Associates

[57] ABSTRACT

A cartridge case trimming device having mounted on a base a horizontally movable case carriage and case cutting device; the carriage includes cradle, trough, carriage groove, case retainer and toggle clamp; the cutting device includes an arbor head whose height is finely adjustable and an arbor shaft carrying at one end a combination chuck and cutter and on the other end a flexible coupling attached to a motor shaft.

2 Claims, 4 Drawing Sheets

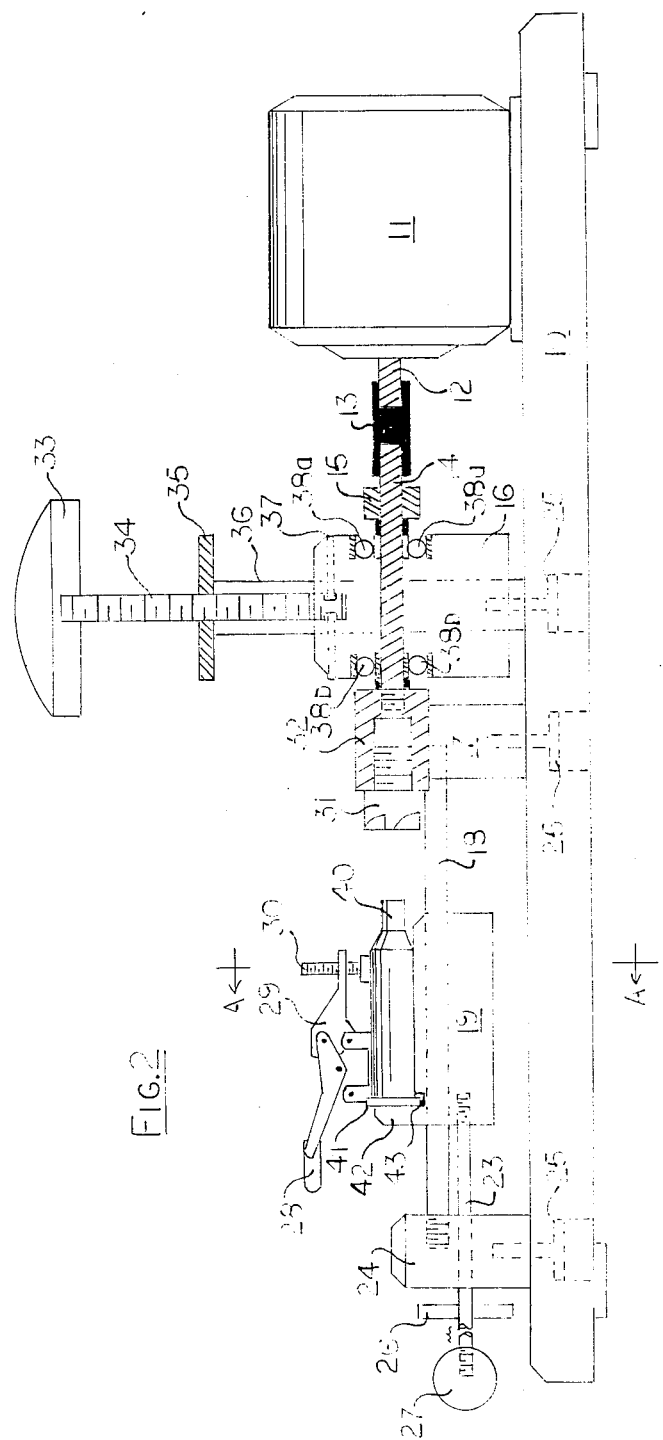

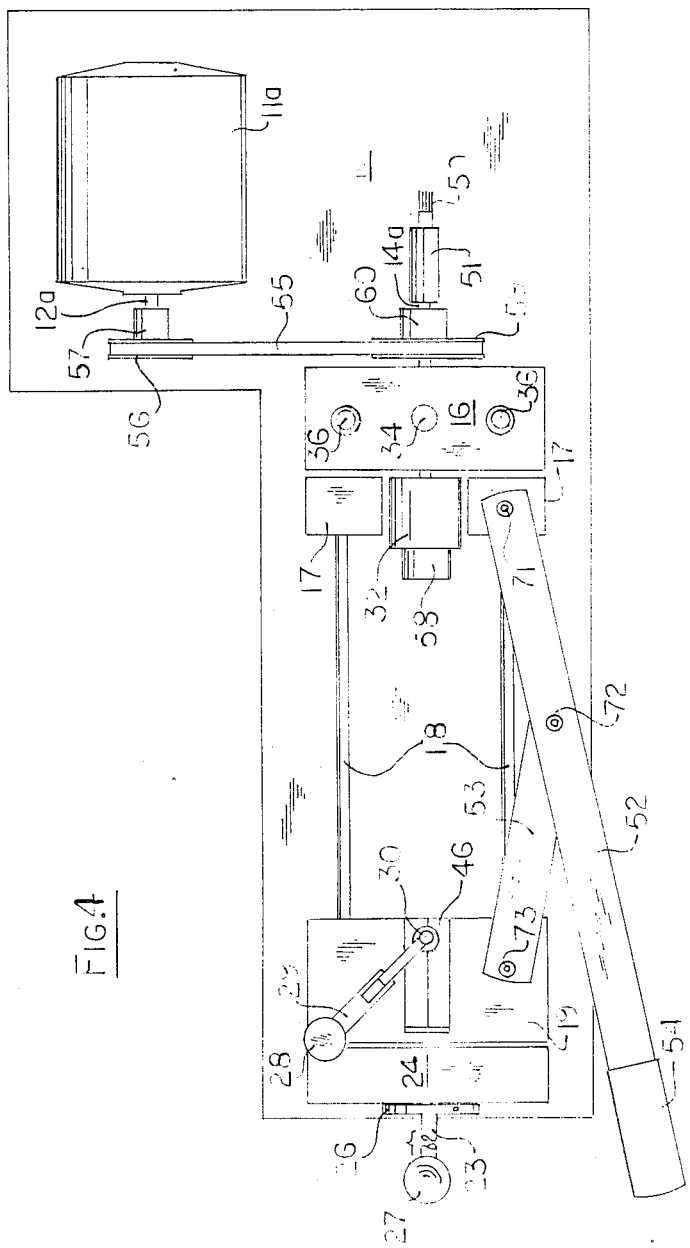

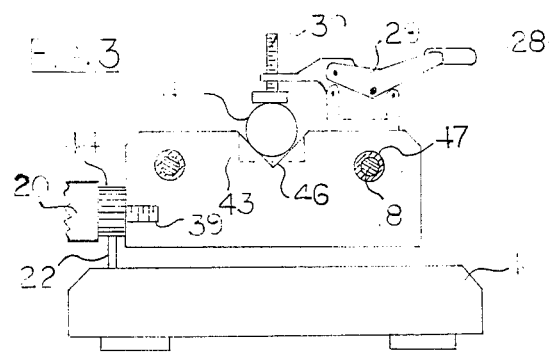
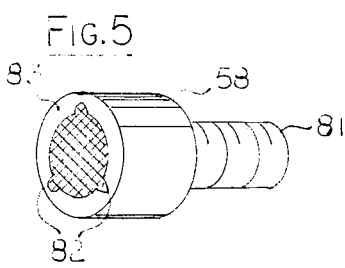
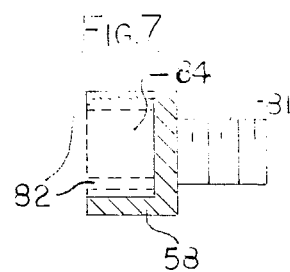
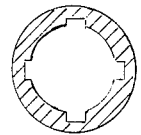
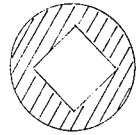

UNIVERSAL CARTRIDGE TRIMMING DEVICE

This invention provides a new and improved means for trimming spent cartridge casings.

BACKGROUND OF THE INVENTION

The sport of shooting pistols or rifles, whether for competition or for leisure, is widely practiced. For many riflemen, marksmen, hunters and the like it is customary to reuse, i.e., reload spent cartridges themselves, be it for the purpose of improved range, accuracy or consistency or for reasons of economy. Yet, before such handloading operation, it is advisable to check and if necessary adjust the length of cartridges because they have the tendency to increase in length due to the forces exerted upon them by firing.

Numerous means for the above stated purpose have been disclosed and/or placed into commercial use, yet, it is believed that none satisfy the need for a device which is simple to operate, universally applicable to various size cartridges but which at the same time provides the same if not improved accuracy of operation over the state of the art. It is believed the instant invention achieves such need.

The following references have been found to be of interest:

U.S. Pat. No. 2,406,170 (Smiley) discloses a cartridge case trimmer wherein the end of a cartridge is clamped into a locking device and, in this position, is moved towards the rim cutting means. Change-over to different size cartridges is difficult and time consuming, and accuracy of trimming may suffer due to possible lack of firmness in the locking means.

U.S. Pat. No. 2,744,307 (Smiley) provides an improved version of the above device, yet, incorporates the same basic drawbacks.

U.S. Pat. No. 3,274,661 (Westbrook) deals with a cartridge trimming and measuring device wherein the cartridge is held in a block movable towards the cutting tool, however, change-over to different cartridge sizes is cumbersome.

U.S. Pat. No. 3,818,563 (Beaulieu) teaches a cartridge trimmer having a certain chuck holder for the cartridge as well as guiding means for the rim of the cartridge for improved accuracy. This reference apparently attempts to overcome the accuracy deficiency of the previous references.

U.S. Pat. No. 4,325,282 (Schaenzer) describes a cargridge resizer and trimmer useful for one particular size cartridge only.

The disadvantages of the above referenced devices are believed to be overcome by the instant invention which provides the user with cartridge trimming means which are simple in operation, readily adaptable for essentially all rifle, pistol or revolver ammunition commercially available, including military ammunition sizes, yet, provide repeatable accuracy of trimming even after trimming a considerable number of such cartridges.

SUMMARY OF THE INVENTION

It is an object of this invention to provide a cartridge trimming device which is readily adaptable to a multiplicity of cartridge designs and sizes;

It is another object of this invention to provide a cartridge trimming device which is accurate even after repeated use;

It is still another object of this invention to provide a cartridge trimming device which may be used easily and speedily;

It is a further object of this invention to provide a cartridge trimming device which may be adaptable for mechanization and for automation.

It is still a further object of this invention to provide means for deburring trimmed cartridge cases.

Other objects of this invention shall become apparent by the appended description and claims.

Figure 1:
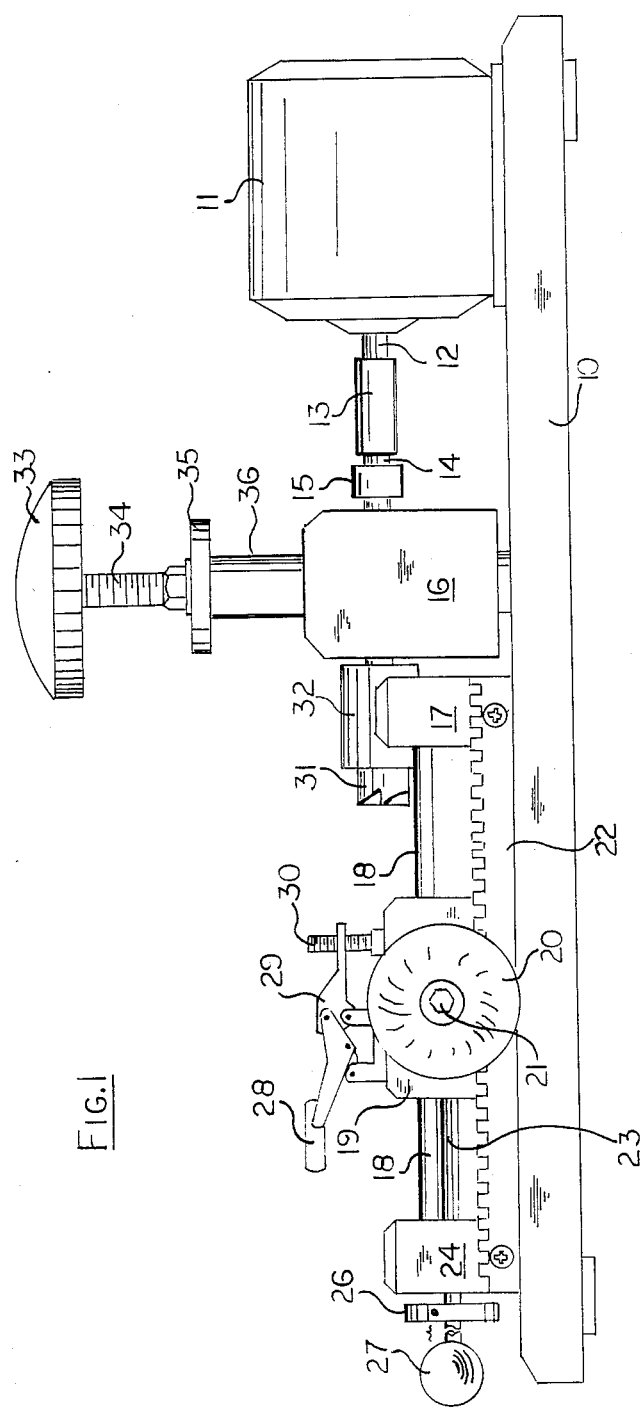
FIG. 1 is an elevated side view of a cartridge trimming device of this invention.

IFIG. 2 is as FIG. 1 except that certain portions are cut away;

FIG. 3 is a sectional view essentially along the line A - A of FIG. 2;

FIG. 4 is a top plan view of a device of this invention incorporating certain modifications;

FIG. 5 is a perspective view of a deburrer of this invention;

FIG. 6a is a front view of a modified deburrer of this invention;

FIG. 6b is a front view of another modified deburrer of this invention;

FIG. 7 is an elevated cross sectional side view of a deburrer as shown in FIG. 5;

DETAILED DESCRIPTION OF THE PREFERRED EMBODIMENTS

As indicated in FIG. 1, the cartridge trimming device comprises a base 10, to which are attached motor 11, two plate columns (one only shown) 36, forward rod support 17 and rear rod support 24; supports 17 and 24 are firmly interconnected by two parallel carriage rods (one only shown) 18 which penetrate case carriage 19 so as to allow said case carriage to slideably and horizontally move along carriage rods 18; to the case carriage 19, knob 20 is rotatably mounted on knob shaft 39 (not shown) by retaining bolt 21; to knob 39 is permanently attached carriage gear 44 (not shown) which interlocks with feed rack 22; to the rear portion of case carriage 19 is attached adjusting rod 23, the latter slidably penetrating rear rod support 24 and including adjustment collar 26 and handling knob 27; case carriage 19 is also equipped with case hold down means 29 which is a toggle clamp including handle 28 and adjustable hold down screw 30; the plate columns 36 are topped by plate 35 which carries arbor head adjusting knob 33, the latter being firmly connected with rotatable head screw 34 facilitating height adjustment for arbor head 16; through arbor head 16, arbor shaft 14 is rotatably located, said shaft 14 being restricted on one side by chuck 32 (which forms one piece with shaft 14) and on the other side by shaft collar 15, and the extended shaft 14 is flexibly connected with motor shaft 12 by coupling 13. Chuck 32 provides the seat for cutter 31 or other items further discussed below.

In FIG. 2, in addition to structural details described in FIG. 1 it is shown that plate columns (only one shown) 36, forward rod support 17 and rear rod support 24 each are fastened onto base 10 by assembly screws 25; further it is demonstrated that arbor shaft 14 is supported within arbor head 16 by two sets of ball bearings 38a and 38b, and cutter 31 is threaded into chuck 32, the latter being one unit in combination with arbor shaft 14; further shown is locking pin 37 designed to retain arbor head 16 in position in relation to head adjustment screw 34, case carriage 19 has located thereon a cartridge case 40 resting within the cradle trough 46 (see FIG. 3), and the case base 41 extends into carriage groove 43, whereas the base end of the case rests agianst case retainer 42; hold down screw 30 of toggle clamp 29 keeps case 40 pressed in position, and in combination with V-shaped cradle trough 46 (see FIG. 3) and carriage groove 43 prevents any motion of case 40 in any direction during trimming and/or deburring operations.

FIG. 3 provides illustration of certain important aspects of this invention namely, case carriage, cradle and groove design; i.e., shown is base 10 over which is suspended case carriage 19 by means of carriage rods 18 surrounded by bushings 47; to the left is provided carriage knob 20 (only partially shown) firmly attached to carriage gear 44, all turnable around knob shaft 39; the teeth and grooves of said gear 44 engaging the corresponding grooves and teeth of feed rack 22; cartridge case 40 rests in cradle 46 of case carriage 19, while hold down screw 30 of toggle clamp 29 keeps case 40 in position.

Certain modifications of a device of this invention have been incorporated in FIG. 4 wherein 10a represents a modified base upon which are mounted motor 11a, forward rod support 17 and rear rod support 24, all other basic elements, as already disclosed in FIGS. 1, 2 or 3 are applicable, namely, arbor shaft 14, arbor head 16, forward rod support 17, carriage rods 18, case carriage 19, the latter including case cradle 46, carriage groove 43 and having mounted thereon toggle clamp 29 with toggle lever 28 and hold down screw 30; plate columns 36 and head screw 34 are disclosed, but other portions have been omitted for the purpose of clarity and simplicity.

However, it should be noted that driving means of this modified device of this invention is accomplished by a gear and toothed timing belt arrangement, more specifically, motor shaft 12a is equipped with drive gear 56 which is part of gear chuck 57, the latter being firmly connected with the shaft by a set screw; a timing belt 55 provides transmission means for correspondingly turning head gear 59 which is firmly connected to head shaft 14a via collar 60; extended head shaft 14a carries an inflexible accessory collar 51 keeping firmly in place a primer pocket cleaning brush 50; whereas chuck 32, instead of having attached thereto a cutter, carries deburrer 58 (the latter being explained in more detail below); furthermore, case carriage may be brought into motion by lever arrangement which consists of lever handle 54 attached to main lever 52 having its fulcrum at point 71; from said lever 52 a connecting lever 53 leading to case carriage 19, said lever 53 being rotatably connected at one end to case carriage 19 at point 73, and with the other end to main lever 52 at point 72.

In FIG. 5 there is represented a perspective side view of deburrer 58 having threaded portion 81 enabling mounting deburrer onto 32, face portion 83 and grooves 82, the latter extending over the length of the hollow inside 84 of deburrer 58 in order to retain stationary steel wool or other suitable deburring abrasive while in operation as indicated in stylized form; the inside of deburrer may have various other shapes as indicated in FIG. 6a and FIG. 6b; FIG. 7 is substantially an elevated cross sectional view of FIG. 5 deburrer 58 representing threaded portion 81 and hollow portion 84 with grooves 82.

Referring generally to FIGS. 1 and 2 the cartridge case trimming device may be effectively used in the following manner:

Hold down device 29 is released by lifting handle 28, and cartridge case 40 is placed onto case carriage 19 in such a fashion that said cartridge case 40 is well situated within cradle trough 46, and case base 41 rests within carriage groove 43 abutting well against case retainer 42.

Handle 28 of hold down 29 is pressed down in order to firmly press cartirdge case onto case carriage 19 (adjustment to hold down pressure is suitably made by means of hold down screw 30).

Based on the cartridge case length required, travel of case carriage is restriced by tightening adjustment collar 26 at a predetermined point on adjusting rod 23; knob 20 is turned clockwise until tip of cartridge case 40 barely touches cutter 31 at which time by means of arbor head adjusting knob 33 the height of arbor head 16 is adjusted so as to have cutter 31 line up properly with tip of cartridge case 40. At this time, motor 11 may be started causing rotation of cutter 31, and knob 20 is turned further in clockwise fashion until the forward motion of case carriage 19 is stopped by adjustment collar 26 hitting rear rod support 24. Knob 20 is now turned counter clockwise to remove cartridge case 40 from cutter 31, and the trimmed cartridge case is removed for further operations such as deburring.

It will be understood that once proper adjustments have been made regarding desired length of cartridge case and height of cutter for a specific type of cartridge case, an essentially unlimited number of stretched cartridge cases having substantially the same design dimensions may be treated in accordance with this invention rapidly and accurately, although it is advisable to take measurements of trimmed cases on a spot basis; also, the cutter may have to be changed or resharpened after a certain number of cases have been trimmed.

The versatility of the device of this invention is further demonstated by its use for deburring the rim of the trimmed cartridge case by means of a deburrer as described in FIGS. 5, 6a and b and 7; such deburrer may be employed for smoothing the surface of items other than of trimmed cartridge case, namely, cut pipe, tubing or rod ends and the like and may have therefore dimensions accommodating sizes other than those encountered with cartridge cases. Therefore, the deburrer may have an outside diameter of 0.125–4 inch, preferably 0.25–3 inch and ususally 0.3–2 inch, the inside diameter may be 0.1–3.75 inch, preferably 0.2–2.85 inch and most preferably 0.275–1.75 inch while having from 2 to 5, usually 3–4 grooves cut on the inside (as described in the drawings) longitudinally to the axis of rotation of the deburrer for the purpose of holding in place the deburring material used. The grooves have a depth depending essentially on the inside diameter of the deburrer, possibly extending such inside diameter by 5–50%, preferably 10–30%, usually 10–20%.

The materials of construction for the trimming device of this invention depend substantially on the stability required and the forces exerted thereupon and may be selected from wood, plastic, metal or combinations thereof. For instance, the base may be constructed from wood; the cutter, deburrer, shafts and bearings from steel; the flexible coupling from plastic such as polyurethane or from an elastomeric composition such as natural rubber; the case carriage from metal such as steel or brass or from plastic such as linear or branched polyethylene, isotactic or syndiotactic polypropylene or polyamide and so on, as dictated by good engineering practices.

For rotating the cutter or deburrer an electrical motor like device has been indicated, however, it should be understood that other means may be employed including a crank for manual operation, air motor, pedal driven device such as a wheel in combination with belt and pully, and the like. Generally, the device of this invention lends itself to mechanized and/or automated operations as well.

Other devices such as a primer pocket cleaning brush may be used with the device of this invention either be replacing the cutter wiht such brush or by using an alternate means as indicated in FIG. 4 item 50. The advantages of the trimming device over known attempts ought not to be underestimated and range from placing the cartridge case into firm position easily and unequivocally; adjusting length of cartridge case to be trimmed accurately and independently from setting height of trimming or deburring tool; constant in-line position of case and tool; rapid reloading of identical cartridge cases to be trimmed without essentially affecting prior adjustments; adaptability to automation and/or mechanization and others.

Although certain specific aspects of this invention have been described, it will be understood that many modifications may be made thereto without departing from the spirit of this invention, the scope of which is expressed in the appended claims.

What is claimed is:

1. A cartridge case trimming device adaptable to a multiplicy of cartridge sizes comprising a base, case carriage, case cutting means and a motor; wherein said carriage includes cradle trough, carriage groove, case retainer, hold down means and means for moving case carriage horizontally on supporting rods; wherein said cutting means comprises arbor head slideably and vertically penetrated by plate columns and horizontally penetrated by a rotatable arbor shaft equipped at one end by a chuck capable of attaching thereto a cutter and at the outer end with a tubular flexible coupling, and means for finely adjusting the height of the arbor head; wherein the shaft of said motor is essentially in line with the arbor shaft and connected thereto with the flexible coupling; and wherein said supporting rods, plate columns and motor are essentially permanently attached to said base.

2. The trimming device of claim 1 wherein said hold down means is a toggle clamp.

* * * * *